United States Patent [19]

Nakagawara et al.

[11] Patent Number: 5,416,642
[45] Date of Patent: May 16, 1995

[54] DUST-IMMUNE METHOD AND APPARATUS FOR GAIN CONTROL OF A READ AMPLIFIER IN A MAGNETIC TAPE TRANSPORT

[75] Inventors: Kazuhiko Nakagawara, Mitaka; Shuichi Saito, Tachikawa; Tatsuo Mori, Mitaka, all of Japan

[73] Assignee: Teac Corporation, Tokyo, Japan

[21] Appl. No.: 227,179

[22] Filed: Apr. 13, 1994

Related U.S. Application Data

[63] Continuation of Ser. No. 996,966, Dec. 23, 1992, abandoned.

[30] Foreign Application Priority Data

Dec. 27, 1991 [JP] Japan .................. 3-359513

[51] Int. Cl.6 .......... G11B 5/02; G11B 27/36; G11B 5/09
[52] U.S. Cl. ....................... 360/27; 360/31; 360/53
[58] Field of Search ........ 360/27, 31, 67, 128; 369/53

[56] References Cited

U.S. PATENT DOCUMENTS

| | | | |
|---|---|---|---|
| 3,633,187 | 1/1972 | Proctor et al. | 360/25 X |
| 3,731,289 | 5/1973 | Bajgert et al. | 360/128 |
| 4,222,081 | 9/1980 | Kamo et al. | 360/67 |
| 4,746,991 | 5/1988 | Efron et al. | 369/53 X |
| 4,777,541 | 10/1988 | Knowlton | 360/27 X |
| 4,819,099 | 4/1989 | Saito | 360/64 X |
| 5,077,623 | 12/1991 | McSweeney | 360/27 X |
| 5,126,990 | 6/1992 | Efron et al. | 369/53 X |
| 5,172,280 | 12/1992 | Quintus et al. | 360/31 |

FOREIGN PATENT DOCUMENTS

| | | | |
|---|---|---|---|
| 0028210 | 2/1984 | Japan | 360/67 |
| 1200329 | 12/1985 | U.S.S.R. | 360/67 |

*Primary Examiner*—Aristotelis Psitos
*Assistant Examiner*—Jennifer Pearson Wright
*Attorney, Agent, or Firm*—Woodcock, Washburn, Kurtz, Mackiewicz & Norris

[57] ABSTRACT

A method of controlling the gain of a read amplifier preparatory to writing data on a length of multitrack magnetic tape, by writing and reading in a read-while-write mode a reference pattern on the tape immediately when the tape starts running. The gain of the read amplifier is automatically controlled so that the output therefrom, representative of the reference pattern read on the tape, may have a magnitude within a predetermined range. The gain control procedure is retried up to a predetermined number of, say, fifteen if the output magnitude of the read amplifier fails to come up to the predetermined range. If the failure in gain control is due to dust accumulation on the tape or on the transducer, the reference pattern is increasingly more likely to be written and read properly during the retries because the dust may be removed by relative sliding motion between the tape and the transducer.

6 Claims, 3 Drawing Sheets

DUST-IMMUNE METHOD AND APPARATUS FOR GAIN CONTROL OF A READ AMPLIFIER IN A MAGNETIC TAPE TRANSPORT

This is a continuation of application Ser. No. 07/996,966, filed Dec. 23, 1992, now abandoned.

BACKGROUND OF THE INVENTION

This invention relates generally to magnetic tape transports, particularly to those suitable for use as or in a subsystem designed to enable a host system to obtain access to data on magnetic tape. More particularly, the invention relates to a method of, and apparatus for, controlling the gain of a read amplifier, included in such tape transports, by writing and reading a reference pattern, known as a reference burst, on the tape in the face of dust that may accumulate on the tape or on the transducer.

Magnetic tape in cartridge form is being widely used as an external storage media of computer systems. Tape cartridges are now available in several different forms. Examples are the two-reel, belt driven cartridge introduced by Minnesota Mining and Manufacturing Company, and the "digital cassette" based on the standard audio cassette developed by Philips and made to similar dimensions though with more precision.

Such tape cartridges include a length of magnetic tape with a plurality or multiplicity of parallel tracks extending longitudinally of the tape. The tape is bidirectional, so that the tracks consist of forward tracks, on which data is written and read during tape, travel in a predetermined forward direction, and reverse tracks.

Usually, in recording data on such bidirectional, multitrack tape, an alternating current signal known as a reference burst is written and read immediately before writing data on the first of forward tracks and on the first of reverse tracks. The output from either of the forward and reverse read heads is directed through a read amplifier into a peak hold circuit. The peak value of either of the reference bursts, held by the peak hold circuit, is then digitized and sent into the controller of the tape transport. The controller controls the gain of the read amplifier so as to approximate the peak of the recovered reference burst to a predetermined value stored therein.

In tape transports having two separate heads for reading and writing data on the tape traveling either forwardly or reversely, data is usually written by what is known as a read-while-write check method. The method is such that data is read and checked for errors as soon as it has been recorded. The gain of the read amplifier is held at a value that has been determined as above, while data is being written by this method. For reading prerecorded data, on the other hand, the gain of the read amplifier is controlled by recovering the prerecorded reference bursts. The reference bursts are additionally utilized for positioning the heads on the tape tracks.

A problem has been encountered in writing and reading reference bursts on the tape preparatory to the recording of data, particularly in cases where the tape transports are used in a dusty environment. Dust on the tape or the heads can prevent the writing and reading of reference bursts, making impossible the writing of data.

Reference bursts are particularly susceptible to the effects of dust because the tape is usually alternately run forwardly and reversely. Such alternate bidirectional travel of the tape results in the accumulation of dust on its opposite end portions as the tape slides past the heads. The accumulated dust can cause errors in writing and reading reference bursts on the end portions of the tape.

SUMMARY OF THE INVENTION

The present invention seeks to minimize the effects of dust in controlling the gain of a read amplifier by writing and reading reference bursts on a length of magnetic tape.

According to the invention, stated in brief, a reference pattern is written and read on a length of magnetic tape traveling along a predefined guide path. The gain of a read amplifier is controlled so that an output therefrom, representative of the reference pattern read on the tape, may have a magnitude within a predetermined guide path. It is then determined whether the output magnitude of the read amplifier, having had its gain controlled as above, is within the predetermined range or not. If not, the tape is stopped, rewound, and the gain control of the read amplifier is retried by again writing and reading the reference pattern on the tape.

Possibly, the failure in gain control of the read amplifier may be due to dust accumulation on the tape or on the transducer. The dust may then be removed by running the tape back and forth in sliding engagement with the transducer, so that the reference pattern is more likely to be written and read properly during the retry than during the initial reading. Preferably, the gain control of the read amplifier may be retried not once but a greater number of, say, fifteen. Dust is increasingly more likely to be removed with the repetition of the retries.

The above and other features and advantages of this invention and the manner of realizing them will become more apparent, and the invention itself will best be understood, from a study of the following description and appended claims, with reference had to the attached drawings showing the best mode of carrying out the invention.

DETAILED DESCRIPTION OF THE INVENTION

Figure 1:
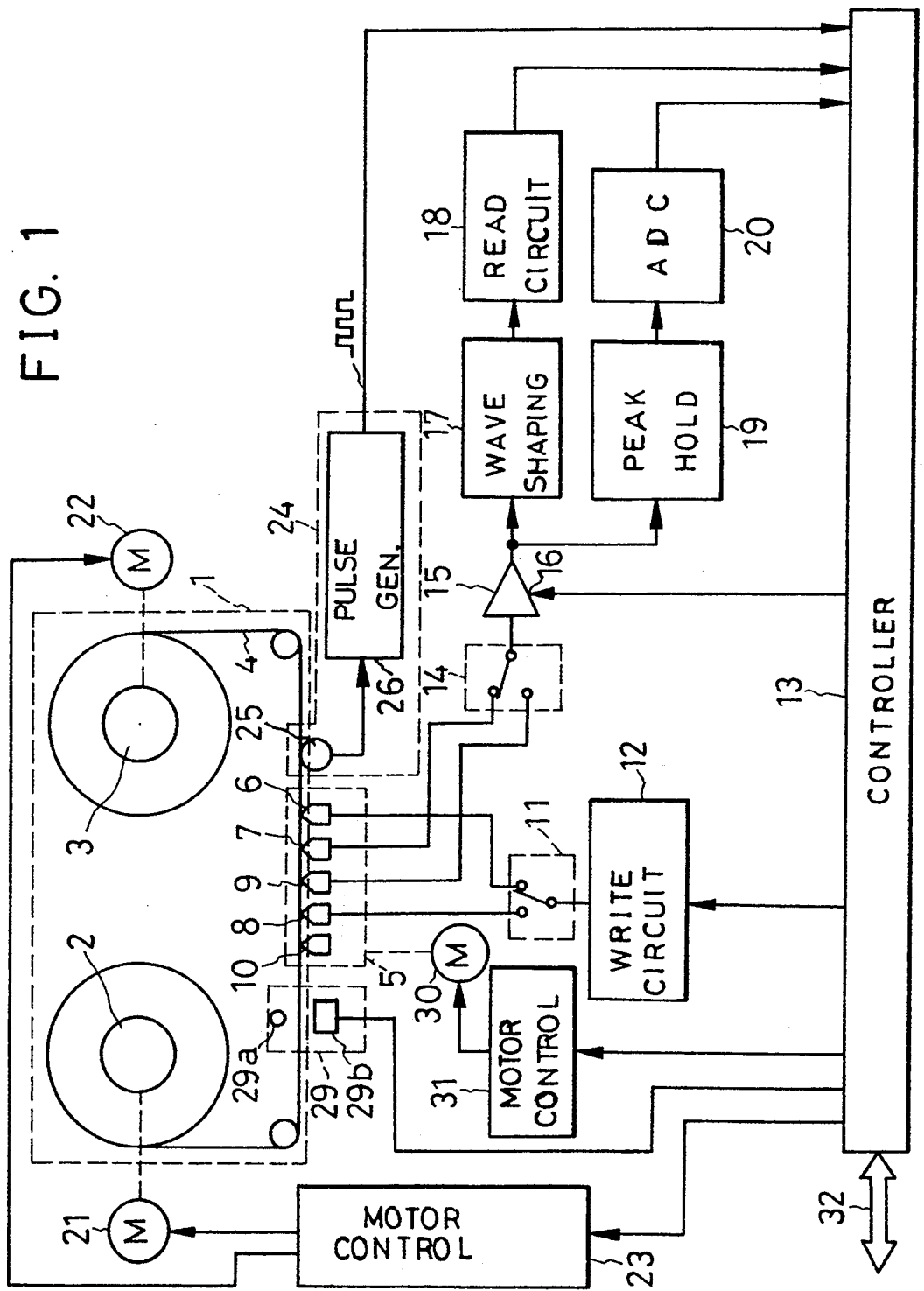
FIG. 1 is a block diagram of a tape transport embodying the principles of this invention.

The present invention will now be described in detail as applied to a tape transport for use with the Philips bidirectional, multitrack "digital cassette". As illustrated in FIG. 1, the exemplified tape cassette or cartridge 1 has a pair of reel hubs 2 and 3 carrying a length of magnetic tape 4. With its opposite ends anchored to the respective reel hubs 2 and 3, the tape 4 extends therebetween along a predefined guide path.

Figure 2:
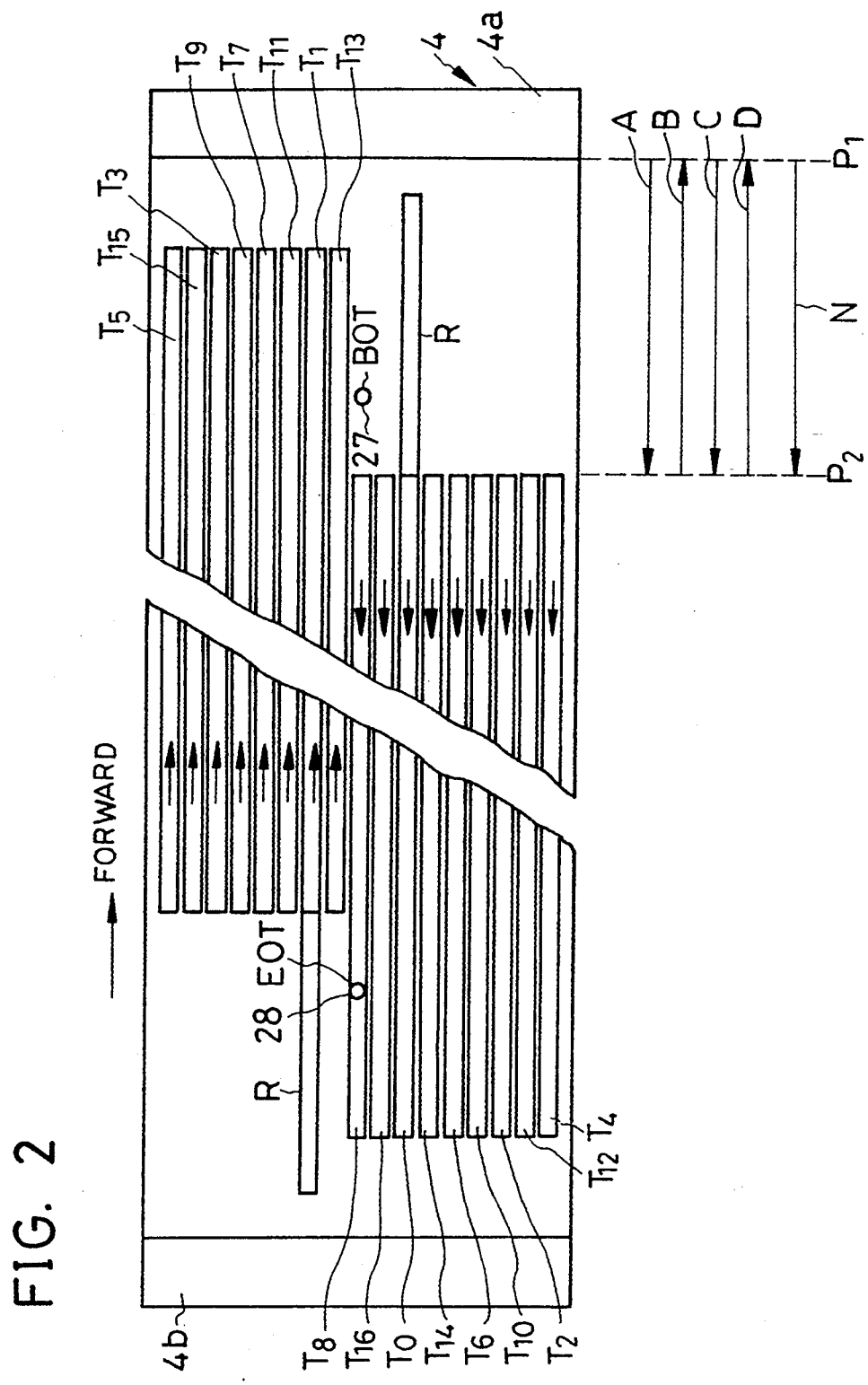
FIG. 2 is an enlarged, fragmentary plan view of a length of bidirectional, multitrack magnetic tape for use with the tape transport of FIG. 1.

FIG. 2 illustrates how data is recorded on the magnetic tape 4 in the tape transport of FIG. 1. The magnetic tape is herein shown to have seventeen tracks $T_0$–$T_{16}$ extending parallel to each other and longitudinally of the tape. Of these, the nine tracks $T_0$, $T_2$, $T_4$, $T_6$, $T_8$, $T_{10}$, $T_{12}$, $T_{14}$ and $T_{16}$ are forward tracks, that is, the tracks on which data is written and read during forward tape travel from reel hub 2 to reel hub 3. The remaining eight tracks $T_1$, $T_3$, $T_5$, $T_7$, $T_9$, $T_{11}$, $T_{13}$ and $T_{15}$ are reverse tracks, that is, the tracks on which data is written and read during reverse tape travel from reel hub 3 to reel hub 2. The tracks $T_0$–$T_{16}$ are traced in the order of the suffixes appended to the reference character T when data thereon is read continuously.

Although the tracks are shown in their full lengths in FIG. 2, data is not necessarily written on the full lengths of tracks; in many cases, data is recorded only partway thereon. Data is customarily recorded on each track in the form of a succession of blocks. Typically, each data block contains a preamble, block marker, control field, data field, cyclic redundancy code, and postamble, in that order.

FIG. 2 also shows reference bursts R which are to be written and read in accordance with the invention for gain control of a read amplifier to be referred to subsequently. Usually an alternating current signal of predetermined amplitude, the reference bursts R are written and read before data is recorded on the first forward track $T_0$ and the first reverse track $T_1$ since the gain of the read amplifier must be controlled before recording data on these tracks.

As is also customary in the art, the tape 4 is formed with a beginning-of-tape (BOT) marker 27 and end-of-tape (EOT) marker 28. The BOT marker 27 and EOT marker 28, both shown as holes, are designed to enable the associated tape transport to sense the start and the end, respectively, of the tape where data can be, or has been, recorded.

With reference back to FIG. 1 the tape transport has a transducer assembly or combination head 5 which, purely for the purpose of illustration, is shown to comprise a forward write head 6, forward read head 7, reverse write head 8, reverse read head 9, and erase head 10. The showing of all these heads in alignment is also for illustrative purposes only; in fact, the forward write head 6 and read head 7, and the reverse write head 8 and read head 9, are both displaced from each other transversely of the tape 4, and the erase head 10 has a gap extending across all the tracks on the tape. Further, for a read-while-write check, the forward write head 6 is disposed upstream of the forward read head 7 with respect to the forward traveling direction of the tape 4, and the reverse write head 8 upstream of the reverse read head 9 with respect to the reverse traveling direction of the tape.

The forward write head 6 and reverse write head 8 are both connected via a selector switch 11 to a write circuit 12 and thence to a device controller 13 which in practice may take the form of a microprocessor. Inputting information to be recorded from the controller 13, the write circuit 12 generates a write signal accordingly and delivers it to either of the forward and reverse write heads 6 and 8.

The forward read head 7 and reverse read head 9 are both connected via another selector switch 14 to a variable gain read amplifier 15. The gain of this amplifier is controlled by a gain control signal supplied from the controller 13 to its control input 16. The output of the read amplifier 15 is connected to a wave shaping circuit 17, thence to a read circuit 18, and thence to the controller 13. The read circuit 18 recreates the data read on the tape 4 by the forward or reverse read head.

Also connected to the output of the wave shaping circuit 17 is a peak hold circuit 19 for holding the peak of the read head output representative of either of the reference bursts R. The peak value of the recovered reference burst is subsequently translated by an analog to digital converter (ADC) 20 into an eight bits digital signal for delivery to the controller 13.

For bidirectionally driving the tape 4 there are provided two tape drive motors 21 and 22 which are coupled directly to the respective reel hubs 2 and 3 of the tape cassette 1. Preferably, the tape drive motors 21 and 22 are controllable speed, direct current motors. The motors are polarized in a tape winding direction; that is, the motor 21 is polarized for revolving the reel hub 2 in a clockwise direction, as viewed in FIG. 1, and the motor 22 for revolving the reel hub 3 in a counterclockwise direction. The motors 21 and 22 are both controlled by a motor control circuit 23 at the direction of the controller 13.

For closed loop servo control of the tape speed a tape speed sensor is provided at 24. The tape speed sensor 24 comprises a sensor roll 25 and a pulse generator or encoder 26. The sensor roll 25 rotates in frictional engagement with the tape 4, and the pulse generator 26 photo-electrically generates a series of tape speed pulses at a recurrence rate proportional with the tape speed. The tape speed pulses are directed into the controller 13. Reference may be had to Sakai U.S. Pat. No. 4,163,532 for more details on the tape speed sensor 24.

Also connected to the controller 13 is a BOT/EOT sensor 29 comprising a light source 29a and a photodetector 29b. This sensor 29 detects the BOT marker 27 and EOT marker 28, both shown in FIG. 2, on the tape 4, as well as the transparent zones 4a and 4b at both physical ends of the tape.

The transducer assembly 5 is movable transversely of the tape 4 for accessing the individual tracks $T_0$–$T_{16}$ thereon. Employed to this end is a head drive motor 30, preferably a bidirectional stepper motor, which is coupled to the transducer assembly 5 via a lead screw, not shown, or like motion translating mechanism. A head drive motor control circuit 31 controls the head drive motor 30 for causing the same to move the transducer assembly 5 from track to track on the tape 4 as dictated by the controller 13.

Figure 3:
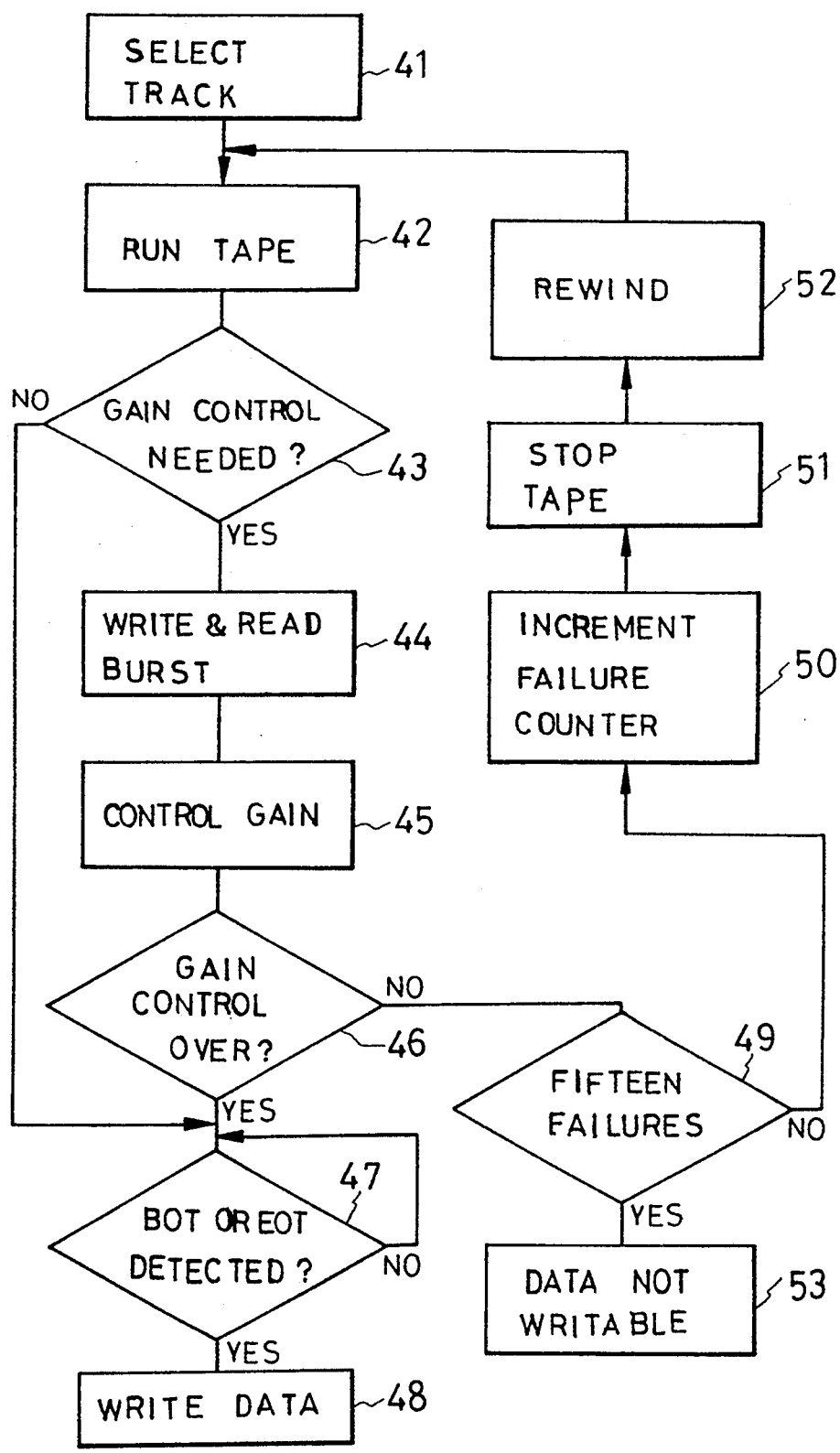
FIG. 3 is a flow chart explanatory of how the gain of a read amplifier, included in the FIG. 1 tape transport, is controlled by an exemplary method according to the invention.

Such being the construction of the tape transport embodying the present invention, reference is now invited to the flow chart of FIG. 3 for a detailed discussion of how writing on any selected track on the tape 4 is commenced, with or without the gain control of the read amplifier 17 preparatory to such writing, by an exemplary method according to the invention. Factory preprogrammed into the controller 13, the illustrated writing start routine starts at a "Select Track" block 41 where the controller causes the forward write head 6 and forward read head 7, or the reverse write head 8 and reverse read head 9, to be positioned that one of the forward, or reverse, tracks which has been specified by a track command supplied from the host system, not shown, over a data bus shown at 32 in FIG. 1.

Let us assume that the tape 4 has been blank, and that the first forward track $T_0$ has been specified by the host. Then the controller 13 will cause the motor control circuit 31 to actuate the stepper motor 30 for positioning the forward write head 6 and read head 7 to be positioned on the track $T_0$.

Then, according to the next "Run Tape" block 42, the controller 13 causes the tape drive motor control circuit 23 first to drive the tape drive motor 21 for running the tape 4 reversely until the transparent part 4a, FIG. 2, becomes positioned opposite the BOT/EOT sensor 29, and then to drive the other tape drive motor 22 for running the tape forwardly at constant speed.

Then comes a "Gain Control Needed?" node 43 where it is questioned whether the read amplifier 15 is in need of gain control or not. The gain control of the read amplifier 15 is required preparatory to writing on the first forward track $T_0$ and the first reverse track $T_1$, as well as to writing after a preexisting track of a tape cassette that has been just loaded in this tape transport. No gain control is necessary for writing, for example, on the track $T_2$ after writing on the track $T_1$, because then the gain control has been completed. In this latter case, that is, if the answer to the node 43 is no, the routine jumps to a "BOT or EOT Detected?" node 47, at which the controller waits for the detection of the BOT marker 27 or EOT marker 28, and writing is started at a block 48 upon detection of the BOT or EOT marker.

The former case is now under consideration, since it has been assumed that data is to be written on the first forward track $T_0$. The answer to the "Gain Control Needed?" node 43 is therefore yes, so that a reference burst is written and read just before writing data on the track $T_0$ according to a block 44. To this end the controller 13 causes the write circuit 12 to supply a reference burst signal to the forward write head 6. The reference burst R thus written on the tape 4 as shown in FIG. 2 will be read immediately by the forward read head 7 in the write-while-read mode.

Next comes a "Control Gain" block 45. For the gain control of the read amplifier 15, the reference burst output from the forward read head 7 is directed into the peak hold circuit 19 after being amplified by the read amplifier. The peak amplitude of the amplified reference burst is digitized by the ADC 20 and thereby sent into the; controller 13, where the peak is compared with a predetermined value stored therein. Further the controller 13 conventionally controls the gain of the read amplifier 15 so as to approximate the peak of the amplified reference burst to the predetermined value.

Typically, the controller controls the amplifier gain so that the peak of the amplified reference burst may fall in a range of 1.5 V plus and minus 50 mV. Possibly, however, the output amplitude of the forward read head 7 may be so low that the output from the read amplifier 15 will fall short of that range even if its gain is maximized. Such unduly low amplitude of the read head output may be due to dust accumulation on the tape 4 or on the transducer assembly 5.

The next "Gain Control Over?" node 46 asks if the gain control of the read amplifier 15 has been completed. In order to answer this question the controller 13 determines if the peak of the amplified reference burst falls in the range of 1.5 V plus and minus 50 mV. If it does, that is, if the answer to the node 46 is yes, the routine proceeds to the "BOT or EOT Detected?" node 47 and thence to the "Write Data" block 48. The writing of data on the track $T_0$ according to the block 48 will be made in the read-while-write check mode, such that data will be read by the forward read head 7 and checked for errors as soon as it has been written by the forward write head 6.

On the other hand, if the answer to the "Gain Control Over?" node 46 is no, that is, if the peak of the read amplifier output falls short of the range specified above, then at the next "Fifteen Failures?" node 49 it is asked if the gain control of the read amplifier has failed up to a predetermined number of, fifteen in this case, times. It is understood that the controller 13 includes a counter, not shown, for counting such failures up to the predetermined number.

Since this is the first such failure, the answer to the "Fifteen Failures?" node 49 is no, and the failure counter is incremented at the next block 50. The tape is then stopped at a "Stop Tape" block 51 and rewound fully back to its transparent zone 4a, FIG. 2, at the next block 52.

Then the routine returns to the "Run Tape" block 42 for the second attempt, or first retry, at gain control of the read amplifier. The dust, the possible cause for the first failure in gain control, may then have been removed by relative sliding motion between tape 4 and transducer assembly 5. The answer to the "Gain Control Over?" node 46 will be yes in that case. Then writing of data may be started at the "Write Data" block 48 after detecting the BOT marker according to the "BOT or EOT Detected?" node 47.

The answer to the "Gain Control Over?" node 46 may still be no at the first retry. Then the foregoing retry procedure are to be repeated until the peak of the read amplifier output comes up to the above indicated range with the removal of the dust.

However, if the gain control of the read amplifier has failed fifteen times, the consequent answer "yes" to the "Fifteen Failures?" node 49 directs the routine to a "Data Not Writable" block 53. Thereupon the controller 13 will give up writing data on the tape and inform the host system to that effect. The user may then either clean the transducer assembly 5, replace the tape cassette 1, have the tape transport repaired, or replace it.

The flow chart of FIG. 3 will be better understood by referring again to FIG. 2. As indicated by the arrow A in this figure, the tape 4 is started to run forwardly in a position $P_1$ according to the "Run Tape" block 42 for writing and reading the reference burst R immediately before the first forward track $T_0$. The possible answer "no" to the "Gain Control Over?" node 46 will be obtained in a position $P_2$, whereupon the tape will be rewound to the position $P_1$, as indicated by the arrow B. Then the writing and reading of the reference burst R will be retried while the tape is again running forwardly as indicated by the arrow C. If the amplifier gain proves to be uncontrollable as a result of this first retry, a similar retry will be repeated up to fifteen times, as will be understood from the arrows D and N. The gain will become increasingly controllable with the repetition of retries, if dust is the cause for the failures.

It will be self evident that the gain is similarly controlled before writing data on the first $R_1$ of reverse tracks, by writing and reading a similar reference burst immediately before that track.

Despite the foregoing detailed disclosure, it is not desired that the present invention be limited by the exact showing of the drawings or the description thereof. For example, not only the tape may be rewound for retry in the event of a failure in gain control of the read amplifier, but also the transducer assembly may be moved transversely of the tape, for more positively removing the dust. It will also be readily contemplated to provide an analog comparator, which may be external to the controller 13, for comparing the output from the peak hold circuit 19 with a predetermined value, instead of digitizing the peak hold circuit output as in the illustrated embodiment. All these and other modifications, alterations or adaptations of the invention are intended in the foregoing disclosure. It is therefore appropriate that the invention be construed broadly and in a manner consistent with the fair meaning or proper scope of the attached claims.

What is claimed is:

1. In a tape transport having a magnetic head for writing and reading information in a read-while-write mode on a length of multitrack magnetic tape traveling along a predetermined guide path, and a controllable gain read amplifier for amplifying an output from the magnetic head, the tape having a plurality of tracks extending parallel longitudinally of the tape, a first tape marker disposed adjacent a first end of the tape and a second tape marker disposed adjacent the second end of the tape, the tracks having forward tracks on which data is written and read during forward tape travel and reverse tracks on which data is written and read during reverse tape travel, a dust-immune method of controlling the gain of the read amplifier preparatory to writing on tracks on the tape, which method comprises:

(a) positioning the magnetic head on a selected track on the tape;
   (b) running the tape from the second toward the first end thereof to a position between the first end of the tape and the first tape marker;
   (c) running the tape from the first toward the second end thereof along the predetermined guide path so as to create relative sliding motion between the tape of the magnetic head;
   (d) determining whether the gain control of the amplifier is necessary or not before writing on the selected track;
   (e) writing, if necessary, a reference pattern in a preassigned position before the selected track, the preassigned position including a portion between the first end of the tape and the first tape marker;
   (f) reading the reference pattern in a read-while-write mode;
   (g) controlling the gain of the read amplifier in order that an output from the read amplifier, representative of the reference pattern read on the tape, may have a magnitude within a predetermined range;
   (h) determining whether the output magnitude of the read amplifier, having had the gain thereof controlled as at step (g), is within the predetermined range or not;
   (i) starting writing on the selected track if the output magnitude of the read amplifier has proved to be within the predetermined range, and the first tape marker is detected;
   (j) running the tape from the second toward the first end thereof so as to create relative sliding motion between the tape and the magnetic head, if the output magnitude of the read amplifier has proved to fall short of the predetermined range; and
   (k) retrying the gain control of the read amplifier by repeating the procedure of steps (c) through (h).

2. The dust-immune gain control method of claim 1 which further comprises:

(a) counting failures in gain control of the read amplifier; and
   (b) giving up writing on the selected track when the failures are counted to a predetermined number.

3. The dust-immune gain control method of claim 2 wherein the predetermined number is fifteen.

4. In a magnetic tape transport, in combination:

(a) tape drive means for bidirectionally running a length of magnetic tape along a predetermined guide path the tape having a plurality of tracks extending parallel longitudinally of the tape, a first tape marker disposed adjacent a first end of the tape and a second tape marker disposed adjacent the second end of the tape, the tracks having forward tracks on which data is written and read during forward tape travel and reverse tracks on which data is written and read during reverse tape travel;
   (b) a magnetic head for reading and writing information on the tape by relative sliding motion between the tape and magnetic head;
   (c) a controllable gain read amplifier connected to the magnetic head for amplifying an output therefrom;
   (d) a write circuit connected to the magnetic head for supplying thereto a reference signal to be recorded in a preassigned position before a selected track as a reference pattern for use in controlling the gain of the read amplifier, the preassigned position including a portion between the first end of the tape and the first tape marker;
   (e) detector means connected to the read amplifier for detecting the magnitude of an output therefrom;
   tape marker sensor for sensing the first and the second tape markers on the tape; and
   (g) a controller connected to the tape drive means and the read amplifier and the write circuit and the detector means and the tape marker sensor for controlling the gain of the read amplifier so that the output from the read amplifier, representative of the reference pattern that has been read on the tape, may have a magnitude within a predetermined range, for running the tape in a first direction along the predetermined guide path in order to write and read the reference signal, for running the tape in a second direction, opposite to the first direction and retrying the gain control of the read amplifier if the output magnitude of the read amplifier falls short of the predetermined range, and for starting writing on the selected track if the output magnitude of the read amplifier has proved to be within the predetermined range, and the first tape marker is detected.

5. The invention of claim 4 wherein the detector means comprises:

(a) a peak hold circuit connected to the read amplifier; and
   (b) an analog to digital converter connected between the peak hold circuit and the controller.

6. The invention of claim 4 wherein the magnetic head comprises a separate read head and write head for operation in a read-while-write mode.

* * * * *

UNITED STATES PATENT AND TRADEMARK OFFICE
CERTIFICATE OF CORRECTION

PATENT NO. : 5,416,642

DATED : May 16, 1995

INVENTOR(S) : Nakagawara et al.

It is certified that error appears in the above-indentified patent and that said Letters Patent is hereby corrected as shown below:

Col. 5, Line 39:   after "the" (first occurrence) delete ";".

Col. 8, Line 33:   before "tape" add --(f) a--.

Signed and Sealed this

Twelfth Day of September, 1995

Attest:

BRUCE LEHMAN

Attesting Officer

Commissioner of Patents and Trademarks